July 31, 1962  E. H. LAND  3,047,387
PHOTOGRAPHIC PROCESSES, PRODUCTS AND DEVICES
Filed June 15, 1959  6 Sheets-Sheet 1

INVENTOR.
Edwin H. Land
BY Brown and Mikulka
and
Robert E. Corb
ATTORNEYS

July 31, 1962     E. H. LAND     3,047,387
PHOTOGRAPHIC PROCESSES, PRODUCTS AND DEVICES
Filed June 15, 1959     6 Sheets-Sheet 2

INVENTOR.
Edwin H. Land
BY Brown and Mikulka
and Robert E. Corb
ATTORNEYS

July 31, 1962 E. H. LAND 3,047,387
PHOTOGRAPHIC PROCESSES, PRODUCTS AND DEVICES
Filed June 15, 1959 6 Sheets-Sheet 4

INVENTOR.
Edwin H. Land
BY Brown and Mikulka
and
Robert E. Corb
ATTORNEYS

July 31, 1962 E. H. LAND 3,047,387
PHOTOGRAPHIC PROCESSES, PRODUCTS AND DEVICES
Filed June 15, 1959 6 Sheets-Sheet 5

INVENTOR.
Edwin H. Land
BY Broward Mikulka
and
Robert E. Corb
ATTORNEYS

July 31, 1962 E. H. LAND 3,047,387
PHOTOGRAPHIC PROCESSES, PRODUCTS AND DEVICES
Filed June 15, 1959 6 Sheets-Sheet 6

INVENTOR.
Edwin H. Land
BY Brown and Mikulka
and
Robert E. Corb
ATTORNEYS

United States Patent Office 3,047,387
Patented July 31, 1962

3,047,387
PHOTOGRAPHIC PROCESSES, PRODUCTS
AND DEVICES
Edwin H. Land, Cambridge, Mass., assignor to Polaroid Corporation, Cambridge, Mass., a corporation of Delaware
Filed June 15, 1959, Ser. No. 820,266
27 Claims. (Cl. 96—48)

The present invention relates to photography and more particularly to novel photographic processes of the type in which a fluid is distributed between a pair of superposed sheets, photographic products useful therein and improved apparatus for performing such processes.

This application is a continuation-in-part of copending U.S. patent application Serial No. 522,605, filed July 18, 1955, entitled Photographic Processes, Products and Devices, now abandoned.

A variety of photographic processes may be effected by spreading a fluid in a uniformly thin layer over a predetermined area between a pair of superposed sheets to form what may be termed a sandwich. For example, a photosensitive stratum on one of the sheets may be developed by a processing fluid spread between it and another sheet. Here, spreading may be effected after photoexposure to develop an existing latent image or before photoexposure so that a latent image formed immediately thereafter is developed spontaneously. Alternatively, a photosensitive fluid may be spread between the sheets in the presence of a developer to provide a stratum which, when photoexposed shortly after being formed, receives a latent image that is developed spontaneously. Thereafter, the sheets may be stripped apart, for example to separate the layer of fluid from a print so formed, or may be maintained in superposed relation to provide the print with a protective covering.

It has been proposed to spread the photographic fluid between the superposed sheets either intermittently from successive containers supported on one of the sheets between regions in which single prints are to be produced, or continuously from a more or less permanent container supported apart from the sheets for providing the supply of fluid necessary to produce a plurality of prints. In the former case, the sheets, with one of the successive containers interposed between them, are advanced between pressure-applying members that rupture the container and distribute its contents between the sheets to produce a single print. Here, the problems of supplying and controlling the fluid are simply resolved. But since the overall thickness of the resulting association of sheets and container is thicker in the vicinity of the container than in the vicinity of the distributed contents, the design of the pressure-applying members is complicated by the necessity for accommodating for the difference in thickness. Moreover, because the fluid contents of the container are spread directly from the container, control over the distribution of the fluid is somewhat limited, posing other problems relating, for example, to the quantity of fluid which must be supplied in the container. In the latter case, the problems of supplying and controlling the fluid are, in certain respects, more difficult. However, since the association of sheets and distributed fluid is of substantially uniform thickness throughout its length, simplified pressure-applying members having a fixed gap between them may be employed. The present invention contemplates a novel container which makes it practicable to enjoy at once the facility of supplying and controlling the fluid permitted by a plurality of disposable containers, the simplicity of pressure-applying members having a fixed gap between them, a reduction in the quantity of fluid required, and other advantages to become apparent below.

The present invention contemplates the provision of a container which is designed to advance longitudinally in the direction of one of its ends from between a pair of sheets while being compressed in order to cause its contents to be discharged from the other of its ends in an elongated mass. Thereafter, a sandwich is formed by spreading this mass in a thin layer over a predetermined area between the pair of sheets transversely of the direction in which the container has been advanced. Since discharging the contents is accompanied by ridding the sandwich of the container, spreading of the fluid in the absence of the container between the sheets may be accomplished by pressure-applying members of fixed gap, for example merely the longitudinal edges of a slot.

Accordingly, the primary objects of the present invention are: to enclose a photographic fluid within an elongated container one end of which is provided with a closed mouth through which, when opened, compressional forces applied to the container cause the fluid to be ejected in an elongated mass; and to provide a photographic product adapted to be employed according to this process.

Other objects of the present invention are: to provide a process involving ejecting a photographic fluid in an elongated mass along one end of an area of a first sheet from an elongated container superposed on the first sheet by advancing the container in its direction of elongation while compressing sections succeeding from its leading end and removing the container from the sheet, and spreading the fluid between the first sheet and a second sheet in the direction of the other end of the area and transversely of the direction of elongation of the mass in order to form a thin layer of the fluid over said area; to provide novel photographic products adapted to be employed in said process; and to provide improved photographic apparatus for employing said product and performing said process.

A further object of the present invention is to provide a photographic assemblage comprising at least a photographic sheet and a container of the foregoing type removably associated with it.

Still another object of the present invention is to provide photographic products and apparatus comprising pressure-applying means through which succeeding sections of the container are adapted to advance so that a photographic fluid is discharged through its mouth in an elongated mass extending transversely of a first sheet, and second pressure-applying means through which a first sheet and a second sheet are adapted to advance transversely of the elongated mass in order to spread the fluid in a thin layer therebetween.

Other objects of the invention will in part be obvious and will in part appear hereinafter.

The invention accordingly comprises the several steps and the relation and order of one or more of such steps with respect to each of the others, the product possessing the features, properties and the relation of elements, and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 14:
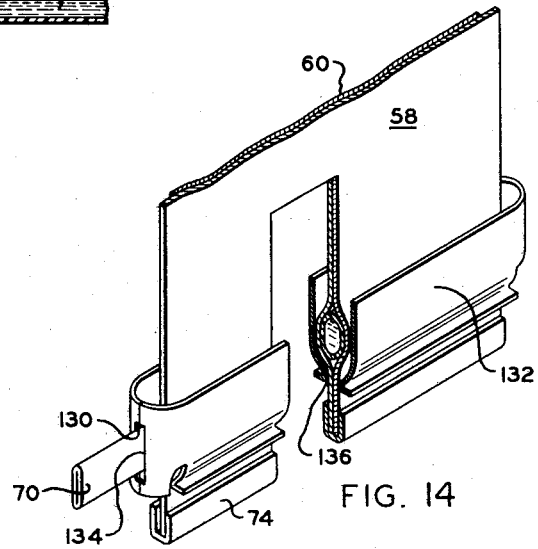
Figure 9:
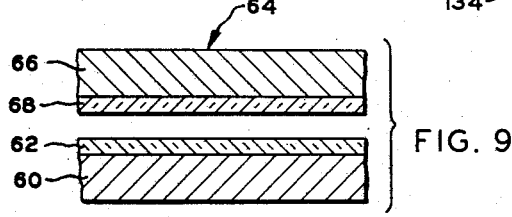
FIG. 9 is an exaggerated sectional view of the sheets of the film unit of FIG. 5, the section being taken midway between the longitudinal edges of the film unit.
Figure 15:
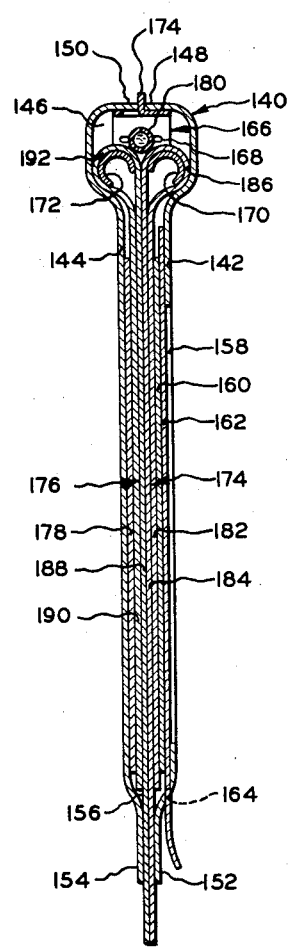
Figure 16:
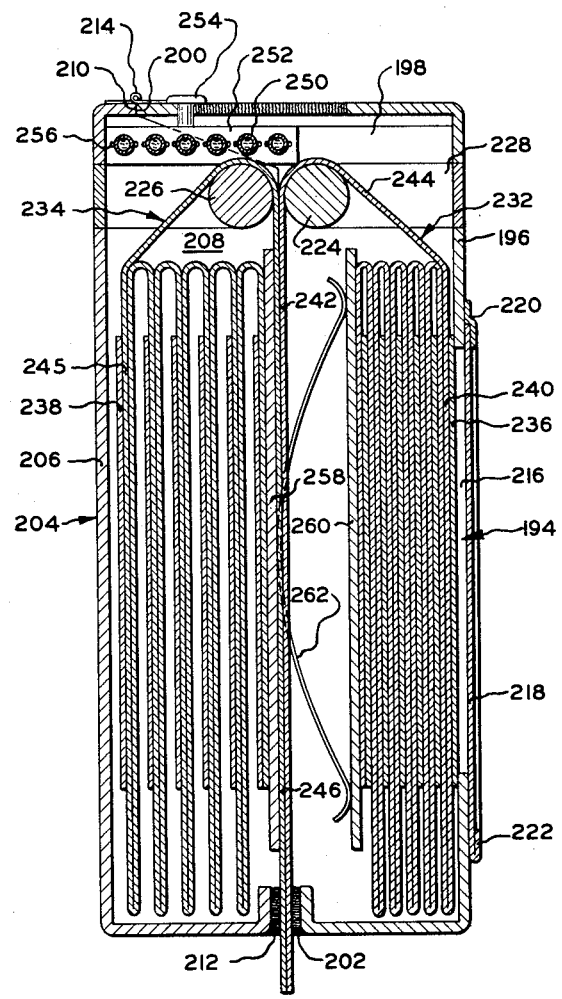
Figure 17:
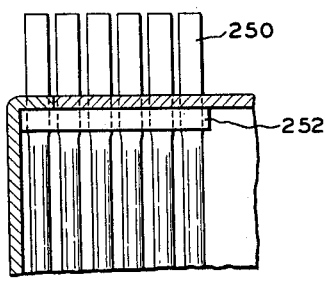
Figure 18:
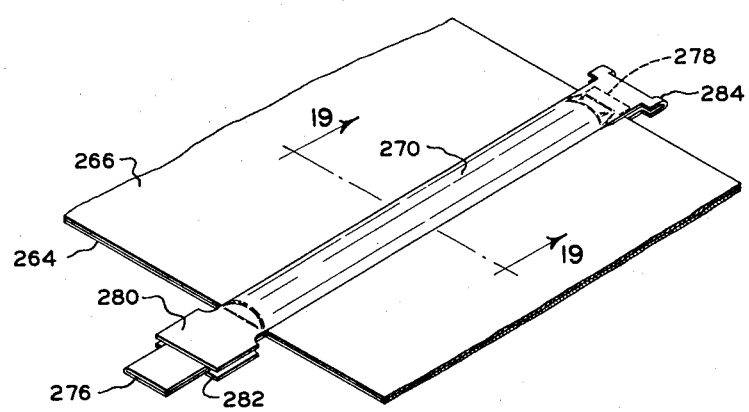
Figure 19:
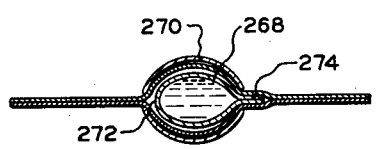

FIG. 14 is an exaggerated, fragmentary, perspective view of another film unit embodying the present invention comprising, in addition to sheets and a container, a rigid element which serves to protect the container during handling of the film unit and to provide pressure-applying means both for compressing the succeeding sections of the container and for spreading the container's contents between the sheets;

FIG. 15 is an exaggerated sectional view of an assemblage embodying the present invention in the form of a loaded disposable camera magazine, the section being taken midway between its longitudinal edges;

FIG. 16 is an exaggerated sectional view of a further assemblage embodying the present invention in the form of a loaded re-usable camera magazine, the section being taken midway between its longitudinal edges;

FIG. 17 is a fragmentary, sectional view of the upper portion of the assemblage of FIG. 16;

FIG. 18 is a broken away, perspective view of a further film unit embodying the present invention comprising, in addition to sheets and a container, a rigid element which serves to protect the container during handling of the film unit and to provide pressure-applying means for compressing the container; and FIG. 19 is a sectional view of the film unit of FIG. 18 taken along the line 19—19.

*General Discussion of Processes and Products of the Present Invention as Illustrated in FIGS. 1 Through 4*

Figure 1:
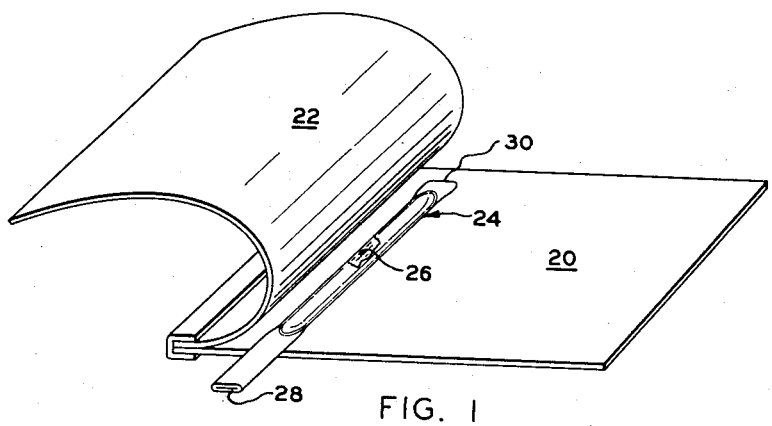
FIGURE 1 is an exaggerated perspective view of a photographic assemblage comprising a pair of sheets and a container of photographic fluid embodying the present invention.
Figures 2, 3:
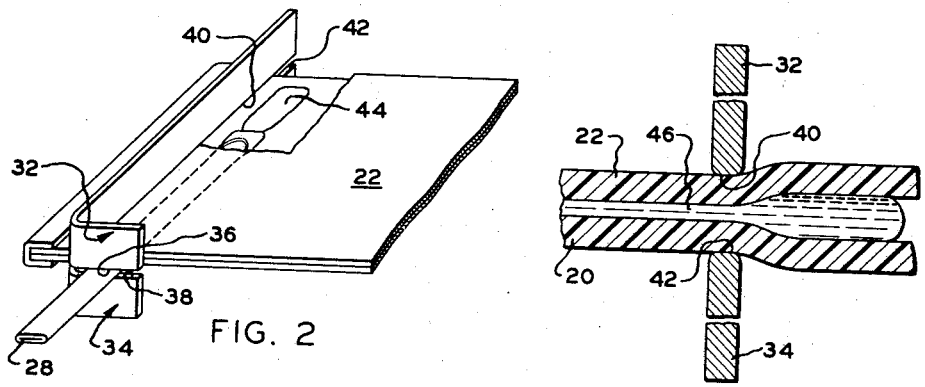
FIG. 2 is an exaggerated, fragmentary, perspective view of the photographic assemblage of FIG. 1 undergoing a step in the processes of the present invention.
FIG. 3 is an exaggerated, fragmentary, sectional view of the photographic assemblage of FIG. 2 undergoing another step in the process of the present invention, the section being taken midway between the longitudinal edges of the assemblage.

An assemblage of photographic elements for effecting the process of the present invention is illustrated in FIGS. 1 through 3 as including a pair of sheets 20 and 22 adapted to be superposed with their inner faces in contiguous relation, that is, either close to or in contact with each other, and an elongated container 24 carrying a predetermined quantity of a photographic fluid 26. For clarity, these elements first will be discussed from a purely mechanical standpoint without reference to the photosensitive and processing materials which, as will become apparent below, in whole or in part are incorporated in fluid 26 or distributed on one or both of the contiguous surfaces of sheets 20 and 22. The forward end 28 of container 24 extends beyond one of the longitudinal edges of sheet 20 so that it may be grasped manually when sheets 20 and 22 are superposed. The rearward end 30 of this container is provided with an initially closed mouth that extends toward the other of the longitudinal edges of sheet 20. FIG. 2 shows the assemblage of FIG. 1 in association with pressure-applying means in the form of a pair of shaped sheet metal elements 32 and 34 providing a first pair of pressure-applying surfaces 36 and 38 between which forward end 28 of container 24 extends, and a second pair of pressure-applying surfaces 40 and 42 between which the forward ends of sheets 20 and 22 extend. Now, as the container is advanced longitudinally in the direction of its leading end 28, its contents are distributed in the form of an elongated mass 44 transversely of the sheets. The distribution of fluid, in effect, is similar with respect to the sheets both before and after it is ejected from the container. FIG. 3 shows a layer 46 of fluid 26 being formed between the sheets as they are advanced between pressure-applying surfaces 40 and 42. Thereafter, the sheets are maintained in superposition for a predermined period during which a visible print is produced. Finally, the sheets may be stripped apart to uncover the print or, where at least one of the sheets is transparent, may be maintained in superposed position to provide the print with a protective covering.

As just indicated, a container embodying the present invention is in the form of a tube having closed ends. One end provides a mouth which, when opened, as sections succeeding from the other end are sequentially compressed, discharges the fluid from the tube in the form of an elongated mass. The medial sections of the tube, generally circular, in one form are so constructed as to resist appreciable deformation as sections succeeding from the leading ends are sequentially compressed and as the composition is discharged from the mouth. Preferably, the cross-sectional shape of these medial sections is only approximately circular, i.e., oblate, elliptic, etc., to allow for expansion of the fluid and is substantially uniform throughout the length of the medial sections so as to obtain uniform distribution of the fluid. Preferably, the tube is fabricated from material having great enough tensile strength to resist stretching or padding under the hydraulic pressure built up in the fluid. Generally, the fluid should be viscous so that it can be readily controlled after being discharged, i.e., so that it will not flow freely of its own accord from the elongated mass which it assumes when it is first discharged from the container. It has been found that the fluid should have a viscosity of at least 100 centipoises at a temperature of 20° C. This viscosity should be, at most, 200,000 centipoises at a temperature of 20° C. if the fluid is to be readily spread from the elongated mass between the sheets. For best results, the fluid-containing compartment of the container is approximately as long as the edge of the photographic frame with which it is aligned and has a cross section which is uniform throughout substantially its entire length. The elongated mass to be spread on a photographic frame of ordinary dimensions to form a layer of acceptable thickness and continuity is best supplied from a container having an elongated cavity the maximum diameter of which is no greater than one-fifteenth of its length.

As indicated above, photosensitive and processing materials, in whole or in part, may be incorporated in fluid 26 or distributed on one or both of the contiguous surfaces of sheets 20 and 22 to make practicable a variety of photographic processes.

In one form, fluid 26 incorporates a developing agent for processing a photosensitive material that has been photoexposed or that is about to be photoexposed. For example, where one of the photosensitive silver salts, ferric salts and diazonium compounds is dispersed on the surface of sheet 20, fluid 26 incorporates the appropriate one of the silver reducers that differentiate between exposed and unexposed photosensitive silver salts to form visible silver particles, couplers that differentiate between exposed and unexposed ferric salts to form visible reduction products, and couplers that differentiate between exposed and unexposed diazonium compounds to form visible dyes. In another form, fluid 26, in lieu of or in addition to such a developing agent, contains a photosensitizing material such as an optical sensitizer for altering the spectral sensitivity or a hypersensitizer for increasing the speed of the dispersed photosensitive material. In a further form, fluid 26 incorporates a photosensitive material which may be photoexposed after being spread between the sheets and may be processed by a developing agent either applied after photoexposure or present, for example dispersed on one of the sheets, during spreading so that development occurs spontaneously. Here, fluid 26, for example, incorporates one of the silver salts, ferric salts and diazonium compounds referred to above or a chromated hardenable colloid material such as a bichromated colloid material. A more specific description of suitable developing agents, photosensitizing agents and photosensitive materials suitable for incorporation in fluid 26 or for dispersion on one of sheets 20 and 22 is given in my U.S. Patent No. 2,846,309, issued August 5, 1958.

Where the photosensitive material to be processed is a silver salt, a silver complexing agent, as well as a silver developing agent, may be incorporated to effect silver transfer as well as silver reduction. For example, where sheet 20 is coated with a silver halide stratum and sheet 22 is coated with a silver-receptive stratum, fluid 26, in one form, contains a silver halide developer and a silver halide solvent. When fluid 26 is spread between the strata, exposed silver halide is reduced to silver and unexposed silver halide forms a complex silver salt which diffuses to the silver-receptive stratum where it forms a positive print. In another form, fluid 26 carries a quantity of at least one of the components of a silver halide salt to be spread between sheets 20 and 22 in the presence of reagents, including a silver halide developer and a silver halide solvent. Here, the developer and/or solvent either are kept apart from the silver halide composition or are kept together with the silver halide composition in inactive condition. For example, either or both the developer and solvent are dispersed, in dry condition, on one or both of the sheets so as not to coact with the silver halide composition until spread. Or, an alkali-active developer may be mixed with the silver halide composition and kept in a nonalkaline environment until spread in the presence of an alkali dispersed, in dry condition, on one or both of the sheets. A silver precipitating agent may be dispersed by whichever sheet the transfer image is to form or may be mixed with the silver halide composition when the transfer image is to form in the photosensitive stratum itself.

Figure 4:
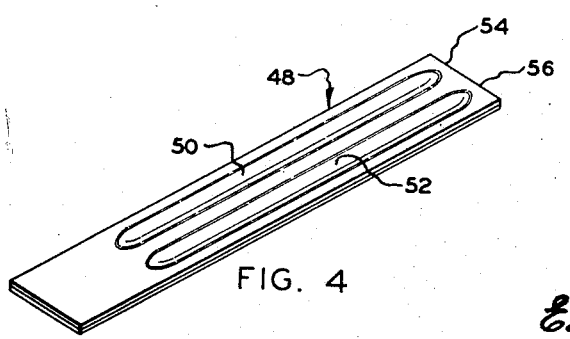
FIG. 4 is an exaggerated perspective view of another container of photographic fluid embodying the present invention.

Two or more of the developing agents, photosensitizing agents and photosensitive materials, referred to above, may be carried separately, in accordance with the present invention, in one or more compartments provided by one or more containers. For example, FIG. 4 shows a container 48 which provides two elongated, substantially parallel compartments 50 and 52 carrying different photographic fluids to be discharged in parallel elongated masses from normally closed mouths 54 and 56 at one end of the container, when sections of the compartments succeeding from the other end of the container are sequentially compressed. In one form, one of the fluids incorporates a silver halide salt and the other the components necessary to provide it with a reducing environment. In another form, the two fluids separately carry silver halide components, such as a salt having silver cations and a salt having halide anions, which do not form a photosensitive compound until mixed. In a further form, one of the fluids carries a silver halide salt and the other the components, including a silver halide developer, necessary to process a latent image formed in the silver halide salt.

The Film Unit of FIGS. 5 Through 9

Figure 5:
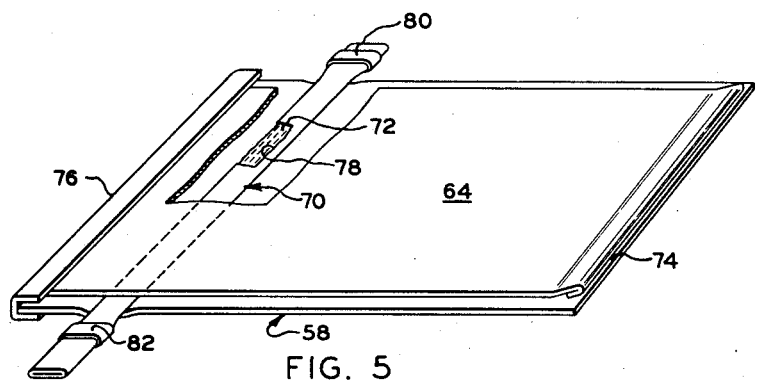
FIG. 5 is a photographic film unit in accordance with the present invention comprising a pair of sheets and a container of photographic fluid, the sheets having opaque outer layers and being sealed at their edges to render the film unit lighttight.

A film unit specifically designed to effect a silver transfer-reversal process is illustrated in FIG. 5. This film unit comprises, in superposition, a photosensitive sheet 58 including an opaque support 60 and a silver halide stratum 62, a print-receptive sheet 64 including an opaque support 66 and a silver-receptive stratum 68, and a container 70 of an alkaline aqueous solution 72 of a silver halide developer and a silver halide solvent to be discharged in an elongated mass for spreading between the sheets. The edges of the sheets are sealed together in order to shield silver halide stratum 62 from ambient light and yet to permit the edges of the sheets to be separated in the exposure chamber of a camera so that the silver halide stratum may be photoexposed. In order to permit the sheets to be stripped apart readily for photoexposure, the end of sheet 64, which is to enter the camera first, is reversely bent to provide a lip 74 which, although sealed to one end of sheet 58, may be readily separated therefrom. While separated within the exposure chamber, the sheets are maintained in alignment by a hinge 76 joining the other ends of sheets 64 and 58. The longitudinal edges of sheet 58 overlap the longitudinal edges of sheet 64 for a reason later to become apparent. A film unit of the type shown in FIG. 5 is designed for use in a camera of the type shown in FIGS. 10 and 11 to be described in detail below.

In one form, stratum 62 contains a conventional photosensitive silver halide emulsion in which one or more of the silver halides, e.g., silver chloride, silver bromide and silver iodide, are dispersed in a suitable colloid material such as gelatin, casein, collodion, cellulose ester, polyvinyl alcohol or linear polyamide.

In one form, silver-receptive stratum 68 is thin relative to silver halide stratum 62 and provides one of the vigorous silver precipitating environments described in my U.S. Patents Nos. 2,698,237 and 2,698,245, issued on December 28, 1954. Such an environment includes silver precipitating nuclei such as the metal sulfides and selenides, the colloidal noble metal or organic thio compounds dispersed in a macroscopically continuous vehicle comprising minute, preferably colloidal, particles of a water-soluble, inorganic, preferably siliceous, material such as silica aerogel. The positive print is formed in this stratum from fine silver particles concentrated primarily at its surface. Only a minute amount of silver in this condition is necessary for image formation because of its extremely high covering power.

Supports 60 and 66 are composed of a paper at least one surface of which has been sized with a suitable material such as hardened gelatin or baryta in plastic. Alternatively, the supports are composed of a plastic material which may be transparent, for example cellulose nitrate, or an organic cellulose ester such as cellulose acetate, cellulose triacetate, cellulose propionate, cellulose butyrate, cellulose acetate propionate or cellulose acetate butyrate. Both supports 60 and 66 are opaque, that is, capable of absorbing ordinary ambient light in order to prevent it from striking silver halide stratum 62. Preferably the supports are red or black in character so as to absorb light of wavelengths less than red which are actinic to stratum 62 if orthochromatic, and of all visible wavelengths which are actinic to stratum 62 if panchromatic.

Developers of one type suitable for dissolution in solution 72 are benzene derivatives having at least two hydroxyl and/or amino groups substituted in ortho or para position on the benzene nucleus. Examples of such developers are hydroquinone, amidol, metol, glycin, p-aminophenol and pyrogallol. Developers of another type suitable for dissolution in the solution are hydroxylamines, in particular primary and secondary aliphatic and aromatic N-substituted or β-hydroxylamines which are soluble in aqueous alkali. Examples of such developers are hydroxylamine, N-methyl hydroxylamine, N-ethyl hydroxylamine, and others described in U.S. Patent No. 2,857,276, issued October 21, 1958, in the name of Edwin H. Land et al. Examples of silver halide solvents suitable for dissolution in the processing solution 72 are conventional fixing agents such as sodium thiosulfate, sodium thiocyanate, ammonium thiosulfate, ammonia and others described in Land United States Patent No. 2,543,181, and associations of cyclic imides and nitrogenous bases such as associations of barbiturates or uracils and ammonia or amines, and other associations described in U.S. Patent No. 2,857,274, issued October 21, 1958, in the name of Edwin H. Land et al.

Figure 6:
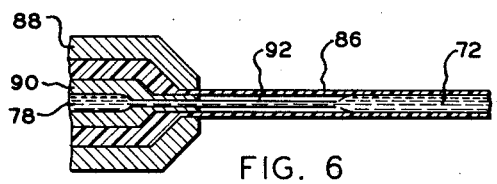
FIGS. 6, 7 and 8 illustrate a method of manufacturing the container of FIG. 5.
Figure 7:
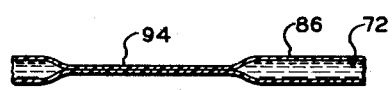
Figure 8:
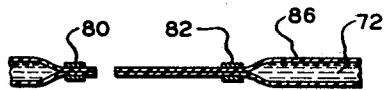

Container 70 provides a cavity 78 the ends of which are closed by a pair of clips 80 and 82. FIGS. 6, 7 and 8 illustrate one method of manufacturing such a container. FIG. 6 shows a plastic tube 86 being extruded between a die 88 and a core 90. Projecting from the center of the core into the plastic tube thus formed is a hollow needle 92 through which fluid 72 flows into sections of the plastic tube that have been suitably cooled. FIG. 7 shows successive portions of the plastic tube pinched at 94 to provide separate fluid-containing cavities. FIG. 8 shows ends of the successive fluid-containing cavities clipped and severed.

Figure 10:
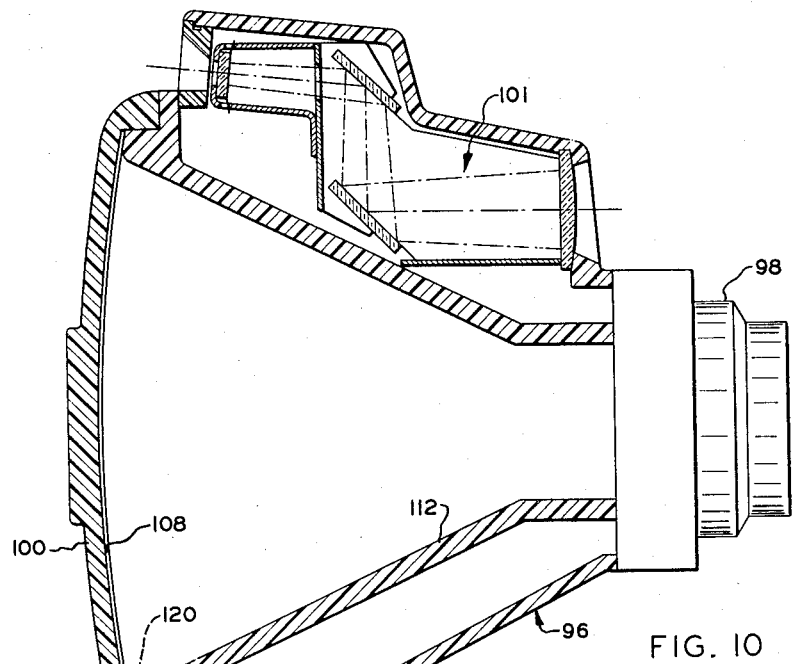
FIG. 10 is a sectional view of a camera embodying the present invention with elements thereof in inoperative condition, the section being taken midway between the sides of the camera.
Figure 11:
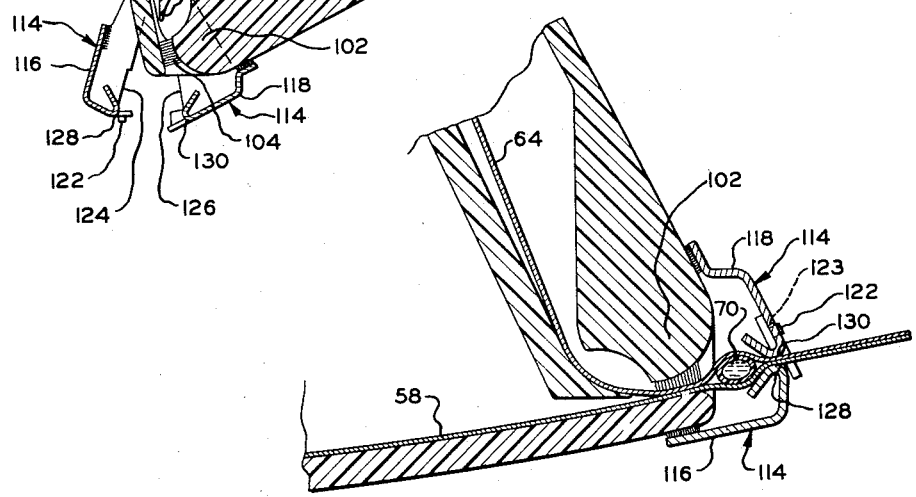
FIG. 11 is a fragmentary sectional view of the camera of FIG. 10 with elements thereof in operative condition.

As indicated above, a film unit of the type shown in FIG. 5 is designed for use in a camera of the type shown in FIGS. 10 and 11. Generally, in response to a single movement of the film unit into the camera, sheets 58 and 64 are separated so that stratum 62 may be photoexposed. After photoexposure, in response first to withdrawal of the container from between the sheets, the fluid is ejected in the form of an elongated mass lying transversely of the sheets. Thereafter, as the fluid is spread between the sheets in the form of a thin layer, the film unit is removed from the camera, the sheets being sealed together by the layer of fluid, to provide a lighttight processing chamber in which a positive print is formed. At the end of this period, the sheets may be stripped apart to uncover the positive print.

The Camera of FIGS. 10 and 11

The camera of FIGS. 10 and 11 comprises a housing 96 at the front of which is a lens and shutter mechanism 98 and at the rear of which is a section 100 detachable from the remainder of the housing to provide access, when desired, to its interior. A view finder 101 is shown at the top of the housing. The lower edge of section 100, together with a cross piece 102, defines a lighttight passage through which the frangibly bonded leading ends of the sheets of the film unit of FIG. 5 are to be introduced. Projecting into passage 104 from within the camera is a wedge-shaped scoop 106 which cooperates with grooves 108 at opposite sides of the camera to separate leading ends of superposed sheets as they are advanced into the camera. Scoop 106 is provided with a tapered edge at 110 adapted to project between the leading ends of the sheets and exerts the initial force required to separate lip 74 from the end of sheet 58 to which it is bonded. Grooves 108 receive the longitudinal edges of sheet 58, which, as indicated above, overlap the longitudinal edges of sheet 64. Scoop 106 is joined by a guide 112 which deflects sheet 64 from the optical path of lens 98 toward the lower wall of the camera. Guide 112 further helps to maintain the interior of the camera lighttight. When the film unit has been advanced into the camera as far as possible, container 70 and the trailing edges of the sheets become positioned within a pressure-applying device generally designated by 114 now to be described. Pressure-applying device 114 includes a rearward element 116 and a forward element 118, both formed, for example, of pressed metal. Housing 96 mounts opposed pins 120 which project into opposed slots in element 116 to permit slidable and pivotal movement thereof, and into opposed openings in element 118 to permit pivotal movement only. Elements 116 and 118 have open positions (FIG. 10) at which the film unit is freely permitted to move into passage 104, and closed positions (FIG. 11) at which the elements are locked together by a pair of detents, one of which is shown at 122, and a pair of notches, one of which is shown at 123. The opposed slots in element 116 permit detents 122 to ride over the edge element 130 when the elements are locked together or unlocked. Suitable means, such as springs, normally bias element 116 downwardly, as viewed in FIG. 10. When closed, pressure-applying device 114 provides a first pair of pressure-applying surfaces 128 and 130 between which the lower ends of sheets 58 and 64 extend. Pressure-applying device 114 further provides a catch (not shown) for removing clip 80 from the mouth of cavity 78 as container 70 is advanced between pressure-applying surfaces 124 and 126. After sheet 58 is photoexposed to actinic light through lens and shutter mechanism 98, the leading end of container 70 is manually grasped and the succeeding sections of the container are withdrawn between pressure-applying surfaces 124 and 126 in order to distribute an elongated mass of fluid transversely of the sheets. Now, when the lower end of the film unit is manually grasped and sheets 58 and 64 are withdrawn from between pressure-applying surfaces 128 and 130, fluid 72 is spread from the elongated mass between the sheets to perform a silver transfer-reversal process. As the film unit emerges from the camera, the sheets are sealed together by the layer of fluid 72 being formed in order to shield, once again, the photosensitive stratum now being processed. After a predetermined processing period, during which a positive print is formed in silver-receptive stratum 68, the sheets are stripped apart to uncover the positive print.

Figures 12, 13:
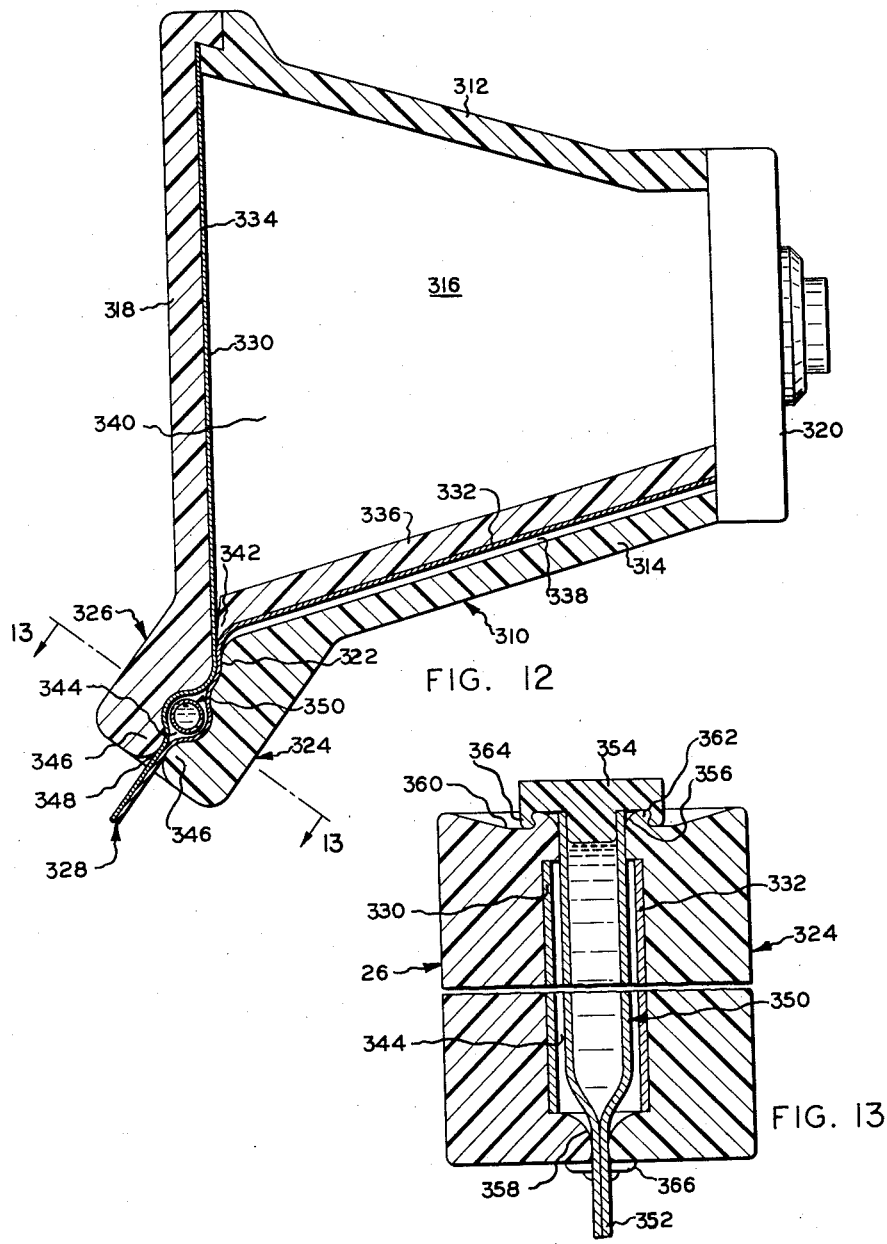
FIG. 12 is a view similar to FIG. 10 of another form of camera embodying the invention.
FIG. 13 is a fragmentary sectional view taken along the line 13—13 of FIG. 12.

The Camera of FIGS. 12 and 13

The process of the invention finds considerable utility in forms of film units other than the type shown in FIG. 5 and including the container of processing fluid. For example, the present process makes possible an entirely new and improved method of photography described and claimed in the copending U.S. application of Edwin H. Land, Serial No. 624,787, filed November 28, 1956. In this method the container of processing fluid is initially provided as a separate element apart from the other elements of the film unit, and the photographic apparatus or camera for exposing and processing the film unit is constructed to permit the introduction of the container into the required association with the other elements of the film unit. Apparatus in the form of a camera of this type is illustrated at 310 in FIGS. 12 and 13 of the drawings and generally includes, in addition to means for allowing the introduction of the container, means for discharging and spreading the fluid contents of the container according to the method of the present invention.

Camera 310 is adapted to be employed with a film unit similar to the film unit in FIG. 5 but differing therefrom in that the container is not part of the film unit and there is no folded lip at an edge of one of the sheets. The camera comprises a housing having an upper wall 312, lower wall 314, side walls 316 and a rear wall 318. An exposure means comprising, for example a conventional lens and shutter assemblage 320 is mounted on the forward portions of the upper, lower and side walls all of which may converge, as shown, toward the front of the housing. Rear wall 318 and lower wall 314 are disposed at oblique angles with respect to one another and form a passage 322 at their intersection through which a film assemblage may be introduced into the camera. Lower wall 314 and rear wall 318 are provided respectively with downwardly and rearwardly extending enlarged sections 324 and 326 located on opposite sides of passage 322.

A photographic film assemblage of the type adapted to be employed in camera 310 is generally indicated at 328 and comprises a photosensitive sheet 330 and a second sheet 332 adapted to be introduced through passage 322 into the camera wherein the sheets are positioned during exposure. The two sheets comprising assemblage 328 may be substantially coextensive with one another and initially secured in face-to-face relation in the manner of the film unit of FIG. 5. As a means for positioning the photosensitive sheet for exposure within the camera, side walls 316 are provided with grooves or tracks 334 located adjacent rear wall 318. The forward surface of rear wall 318 may be so located as to aid in properly positioning the photosensitive sheet for exposure. The camera includes an intermediate wall 336 located adjacent and generally parallel with lower wall 314 and cooperating with the latter to define a storage chamber 338 within which the second sheet is positioned apart from the photosensitive sheet during exposure of the latter. Intermediate wall 336 separates chamber 338 from an exposure chamber designated 340 defined by the intermediate wall, upper wall 312, sides walls 316 and rear wall 318.

Film assemblage 328 is adapted to be introduced into the camera with sheets 330 and 332 secured together in superposed relation, passage 322 being just wide enough for this purpose so that sides of the passage engage the sheets aiding in preventing the admission of light through the passage. Accordingly, means are provided for separating the two sheets and guiding them into proper exposure position, i.e., with sheet 330 retained in guide tracks 334 and sheet 332 located in chamber 338. In the form shown, this last-mentioned means comprises a wedge-shaped portion 342 of intermediate wall 336 having a fairly sharp edge extending into passage 322 in position to enter between the leading ends of the superposed sheets as they are introduced into the passage. The sheets as they are moved through the passage are spaced apart by wedge-shaped portion 342 and guided into their respective positions.

Enlarged sections 324 and 326 of walls 314 and 318 are so formed as to provide a third and generally elliptically shaped chamber 344 located exterior of passage 322 and communicating therewith. The enlarged sections also include pressure-applying portions 346 having generally cylindrical surfaces defining a gap 348 of substantially fixed width in the side of chamber 344 furthest from passage 322. The arrangement of gap 348 and passage 322 is such that an assemblage 328 can be introduced through gap 348, third chamber 344 and passage 322 without bending and with sheets 330 and 332 located in superposition. Gap 348 between pressure-applying portions 346 is of a substantially predetermined width or depth greater than the thickness of the sheets comprising assemblage 328 whereby a fluid composition, provided between the sheets according to the method of the invention, is caused to be spread in a layer as the sheets are withdrawn from the camera through the gap. The pressure-applying portions are shown as being somewhat enlarged so as to strengthen and add rigidity to the structure which may be formed so that the width of the gap will remain substantially constant during spreading of the fluid and may also be provided with suitable strengthening means for this purpose. This construction is such as to lend itself to formation, for example, from molded plastic materials; and in an alternative construction, the pressure-applying means may comprise some other type of fixed gap device, for example, a metal plate having a slot therethrough such as is shown in FIG. 3 and attached to the enlarged sections with the slot located in the position of gap 348.

The processing fluid to be spread between sheets is provided in an elongated tubular container designated 350. Both ends of the fluid-filled container are sealed closed, the leading end 352 of the container being sealed by compressing the walls of the container and securing or bonding the inner surfaces thereof to one another. A plug 354 having recessed flanges 364 is provided in the opposite or trailing end of the container for closing that end.

Container 350 is adapted to be introduced between the portions of sheets 330 and 332 located within third chamber 344 in a position transversely of the sheets. For this purpose the end walls of chamber 344, e.g., side walls 316, are provided with openings designated 356 and 358 located opposite one another in the ends of the third chamber. Opening 356 is shaped to conform substantially to the shape of the container and plugs so that the container may be introduced into chamber 344 therethrough. Opening 358 at the opposite end of chamber 344 is in the form of a narrow slot having dimensions just sufficient to admit the continer in a flattened condition, i.e., leading end 352, whereby the sides of the opening will engage the container and function as pressure-applying members for progressively compressing the container as it is withdrawn in a direction of its leading end through opening 358. The container is adapted to be introduced into chamber 344 between the sheets until the container is located as shown in FIG. 13 with leading end 352 extending through opening 358 exteriorly of the camera where it provides a leader by which the container may be grasped for withdrawing the container through the opening. A recess 360 is provided in the wall surrounding opening 356 together with a projecting lip 362 surrounding the opening between it and the recess. Flange 364 of plug 354 is so formed as to extend around lip 362 into recess 360 when the container is in the position shown whereby a light-tight seal is formed between the plug and the wall of chamber 344 and the plug is retained in covering relation to opening 356 when the container is withdrawn from the chamber through the opening 358.

In order to permit introduction of the container between portions of sheets 330 and 332 located within chamber 344, these portions of the sheets must first be spaced from one another. This may be accomplished in the form shown by continuing to push the sheets through gap 348 into chamber 344 after the sheets have been moved into exposure position and arrested whereby the portions of the sheets within chamber 344 are caused to bend or buckle apart from one another. The sheets in this region may be perforated or creased to facilitate and insure buckling or bending in opposite directions at the desired location and are not secured to one another at their margins in this region.

As the container is withdrawn from between the portions of sheet 330 and 332 located within chamber 344, the trailing end of the container is withdrawn from engagement with plug 354 thereby providing an open mouth through which the fluid contents of the container are discharged in the form of an elongated mass across the sheets as portions of the container succeeding from the leading end are compressed by the walls of opening 358. Light-sealing means, for example, in the form of a sliding member 366, mounted on one of side walls 316, is provided for closing opening 358 following withdrawal of a container therefrom. Opening 356, as previously noted, is closed by plug 354 so that the only opening into chamber 354 from the exterior of the camera is gap 348 through which sheets 330 and 332 project and are adapted to be withdrawn. In an alternative form of the camera, suitable pressure-applying means may be provided in association with opening 358 for both compressing the wall of the container as it is withdrawn and for sealing the opening against the admission of light following withdrawal of the container.

As the sheets of the film unit are withdrawn through gap 348 from chamber 344, hydraulic pressure is generated within the fluid between the sheets causing the fluid to be spread in a thin layer therebetween, and pressure-applying portions 346 engage the surfaces of the sheets closely so that substantially no light can enter chamber 344 and thereby expose portions of the photosensitive sheets as they are drawn through the chamber. The structure of container 350 and camera 310 are such that the container is introduced into the third chamber through an opening at one end and is withdrawn in the same direction through an opening in the opposite end of the chamber; and accordingly, various other types of fluid containers may be employed with the camera including the form of container shown at 24 in FIG. 1 of the drawings. In the camera adapted for use with this form of container, a suitable closure of some type may be provided for opening 356 following introduction of the container through the opening. It should be noted that the width or depth of passage 322 is just sufficient to admit sheets 330 and 332 in superposed relation so that light cannot enter passage 322 around or between the sheets and thereby expose the portion of the photosensitive sheet positioned for exposure within chamber 316. The container and camera may also be constructed so that the container can be introduced into the camera and withdrawn therefrom through a single opening.

The Film Unit of FIG. 14

As illustrated above in the film unit of FIG. 5, solution 72 is adapted to be ejected from container 70 and to be spread between sheets 58 and 60 by pressure-applying means mounted on the camera of FIG. 10. It is sometimes desirable to provide such a film unit with a disposable pressure-applying means in order to simplify the camera by eliminating its permanent pressure-applying means. One such disposable pressure-applying means is shown in FIG. 14 in association with a film unit of the type shown in FIG. 5. This pressure-applying means is an integral rim 132 formed by reversely bending an elongated sheet metal blank and turning its free ends inwardly into contact. The free ends define a slot 134 through which a leading end of container 70 projects. The lower edges of the rim are turned inwardly and are reversely bent to define a slot 136 through which the sheets are adapted to be advanced. In addition to providing pressure-applying surfaces, rim 132 provides a protective casing for the end of the film unit which mounts the container.

The Camera Magazines of FIGS. 15 and 16

The present invention may be embodied advantageously in camera magazines of various types. FIGS. 15 and 16 illustrate two such magazines which are adapted to co-operate with the lens and shutter mechanism of any camera of suitable design. Generally, each of these magazines, ordinarily lighttight, contains two flexible strips, the first carrying a photosensitive element to be photoexposed, and an elongated container of processing fluid to be discharged in an elongated mass as the container is removed from the magazine for spreading between the photosensitive element and an auxiliary element on the second strip.

The magazine, generally flat, has opposed front and rear faces or walls, one of which is designed to transmit actinic radiation to the photosensitive element when desired. The magazine provides, at one of a pair of opposed extremities or ends, a lighttight passage through which the flexible strips may be advanced from within the magazine. Each of the strips has a first or outer section and a second or inner section, the two sections being disposed in overlying relation and generally parallel to the faces of the magazine. The two sections of each strip are joined by a loop in the neighborhood of the other of the opposed ends or extremities of the magazine. The first or outer section of the first strip is stored in the chamber underlying the front face and carries the photosensitive element which is designed to be exposed to actinic radiation through a path provided by one of the faces, preferably the front face. This path, for example, may comprise an aperture in the wall provided with a dark slide, when the radiation is visible; or may be an opaque portion of one of the faces when the radiation is penetrative, i.e., X- or gamma-radiation. The first or outer section of the second strip is stored in the chamber underlying the rear face and carries the auxiliary element which is designed to be superposed on the photosensitive element. The second or inner sections of the two strips extend in superposed relation through the chamber in a region which is more or less midway between the first sections of the first and second strips, and the leading ends of the second sections protrude through the lighttight passage from the chamber. An elongated container is aligned with the elongated, generally V-shaped region defined by converging loop sections of the first and second strips. The elongated container is designed to distribute its contents in this V-shaped region in an elongated mass as sections of the container succeeding from its leading end are compressed while being removed from the magazine. The pair of loops formed by the first and second strips are provided to receive a pair of juxtaposed pressure-applying members, each of which is located within one of the loop between the first and second sections of a strip. The strips may be advanced by an operator grasping their leading ends in order to spread the elongated mass of fluid between the photosensitive element and the auxiliary element. The resulting sandwich, while being formed, advances into the region previously occupied by the second or inner sections of the strips and once formed is permitted to remain in the chamber in this region for a predetermined period during which the photosensitive element is processed. At the end of this period, the sandwich is advanced through the lighttight passage from the magazine by the operator once again grasping the leading ends of the strips. Thereafter, the photosensitive element and the auxiliary element may be stripped apart. Exposing and processing a plurality of photosensitive elements may be accomplished within such an assemblage wherein additional first and second sections of the first strip, alternately carrying the photosensitive elements, for example, are disposed in folded, zigzag fashion between the first-mentioned first (outer) and second (inner) sections; and additional first and second sections of the second strip are disposed, for example, in folded zigzag fashion, between the first (outer) and second (inner) sections of the second strip. Here, a plurality of elongated containers may be provided in the chamber so as to be successively positioned to distribute their contents in successive elongated masses for spreading between successive associated photosensitive and auxiliary elements. The above-described assemblage utilizes the space within the magazine virtually without waste so as to limit the magazine to an overall thickness only slightly greater than the sum of the thicknesses of the sections within it.

FIG. 15 illustrates a disposable, loaded photographic magazine comprising an ordinary lighttight envelope, a strip carrying a single photosensitive element, a strip carrying an auxiliary element and an elongated container adapted to be removed from the magazine while disposing its contents in an elongated mass for spreading between the elements.

The envelope, generally designated by 140, comprises a front face portion or wall 142 and a rear face portion or wall 144 which cooperate to define a chamber 146. The envelope further comprises edge portions, of which sealed pairs of longitudinal edge portions (not shown) and an an integral pair of transverse edge portions 148 and 150 connect the front and rear face portions, and a pair of transverse edge portions 152 and 154 define a lighttight passage 156 communicating with the chamber.

Front face portion 142 is provided with an optical path in the form of an aperture 158 through which actinic light may be transmitted to a photosensitive element 160 within chamber 146. Associated with aperture 158 is a dark slide 162 which, in open position, when removed from chamber 146 through a passage 164, permits transmission of actinic radiation through aperture 158 and which, in closed position, covering aperture 158, renders chamber 146 lighttight.

Supported within chamber 146 on transverse edge portions 148 and 150 is a pressure-applying unit 166 shown in the form of a pressed sheet metal device providing a slot 168, a pair of curved guides 170 and 172 and a lug that extends through the envelope. Pressure-applying unit 166 may be of such an inexpensive construction as to be disposable with the remainder of the envelope after the assemblage has been used.

A pair of flexible strips 174 and 176 within chamber 146 serve to carry photosensitive element 160 and another element 178 between which a processing fluid is to be spread. The processing fluid is carried by an elongated container 180, the leading end of which projects from chamber 146 through slot 168 so that as it is removed from the chamber sections succeeding from its leading end are compressed and the fluid is ejected from a mouth at its trailing end in an elongated mass. Strip 174 has a first or outer section 182 and an inner or second section 184 disposed in overlying relation joined by a loop 186 about guide 170. Strip 176 has a first or outer section and a second or inner section 188 joined by a loop 192 about guide 172. Second sections 184 and 188 extend in superposed relation between the first or outer sections 182 and 190 with the leading ends of the inner sections protruding through passage 156.

In the operation of the magazine of FIG. 15, once photosensitive element 160 has been photoexposed through aperture 158, strips 174 and 176 are advanced between guides 170 and 172 in order to spread the processing fluid between elements 160 and 178. The resulting sandwich, while being formed, advances into the region previously occupied by inner sections 184 and 188 and, once formed, is permitted to remain in this region for a predetermined period during which photosensitive element 160 is processed. At the end of this period, the sandwich is advanced through passage 156 from the magazine. Thereafter, elements 160 and 178 are stripped apart in order to uncover the resulting print. In a preferred form, the envelope is composed of a stiff cardboard or a plastic material and strips 174 and 176 are composed of a flexible paper that is opaque for the purpose of keeping passage 156 lighttight while the assemblage is in operation. As shown, the film unit of FIG. 15 is particularly adapted to effect a silver transfer-reversal process, the element 160 being a silver halide stratum, element 178 being a silver-receptive stratum, and the processing fluid in container 180 being an alkaline aqueous solution of a silver halide developer and a silver halide solvent, these materials being similar to those mentioned above in reference to silver transfer reversal.

FIG. 16 illustrates a self-container, photographic exposing and developing apparatus in the form of a reusable magazine including a strip carrying a plurality of photosensitive elements, a strip carrying a plurality of auxiliary elements, and a plurality of elongated containers each carrying a predetermined quantity of processing fluid to be discharged for spreading between each associated photosensitive element and auxiliary element.

The magazine composed of a durable material, such as plastic, metal or wood, comprises: a forward housing 194 which includes a forward wall or face 196, forward longitudinal side walls, one of which is shown at 198, and forward end walls 200 and 202; and a rear housing 204 which includes a rear wall or face 206, rear longitudinal side walls, one of which is shown at 208, and rear end walls 210 and 212. Forward and rear end walls 200 and 210 are pivoted together at 214 so that forward housing 194 and rear housing 204 are constrained with respect to each other between open position, at which the interior of the magazine is accessible, and closed position, at which forward and rear end walls 202 and 212 define a lighttight passage, and the remaining forward and rear side and end walls are in lighttight engagement. Forward and rear housings 194 and 204 are locked in closed position by suitable means (not shown). The passage defined by forward end wall 202 and rear end wall 212 may be rendered lighttight by such conventional materials as felt, flocking, or the like. Forward wall 196 is provided with a path in the form of an aperture 216 through which actinic light may be transmitted. Associated with aperture 216 is a dark slide 218 which is constrained for movement between open and closed position by a U-shaped rail 220 along three sides of aperture 216 and which is provided with a manually engageable, reversely bent lug 222.

Mounted within the chamber at the upper ends of the forward and rear housings are a pair of juxtaposed pressure-applying members in the form of rollers 224 and 226 which are supported by a pair of brackets 228 and 230 affixed to the inner surfaces of forward wall 196 and rear wall 206, respectively. The rollers are resiliently urged toward each other by such means as springs (not shown).

Within the chamber are a pair of flexible strips 232 and 234 each including a plurality of overlying sections, alternate sections of the former carrying a succession of photosensitive elements 236 and alternate sections of the latter carrying a plurality of auxiliary elements 238 in conjunction with which the photosensitive elements are to be processed. Strips 232 and 234 and elements 236 and 238 are similar in composition, respectively, to strips 174 and 176 and elements 160 and 178 of FIG. 15. Strip 232 is so arranged that a first or outer section thereof designated 240 is disposed underlying forward wall 196, and a second or inner section 242 extends through the chamber and the passage between lower end walls 202 and 212. The first and second sections are joined by a loop 244 about roller 224. The remaining first and second sections of a strip 232 are connected to the lower end of first section 240 and are disposed in folded zigzag fashion between first section 240 and second section 242 so that as successive sections of the strip are advanced from their positions underly face 198, the outermost photosensitive element 236 always faces aperture 216. Strip 234 includes a first or outer section 245 arranged to underly rear wall 206, and a second or inner section 246 arranged to extend through the chamber in superposition with second section 242 and from the passage defined by lower end walls 202 and 212. Sections 245 and 246 are joined by a loop 248 about roller 226 and the remaining sections of strip 234, joined to the lower end of first section 245, are arranged in folded zigzag fashion between outer section 245 and inner section 246.

A plurality of elongated containers 250 are provided supported on a rack 252 which is movably mounted by guides (not shown) on upper end wall 200 of forward housing 194. By means of a manually engageable knob 254, rack 252 is adjustable within the housing in such a way that successive containers can be appropriately positioned to eject their contents into the V-shaped region defined by the loop portions of the strips converging into superposition between rollers 224 and 226. Leading ends of these containers project through slots 256 in the rack and thence through a continuous lighttight slot (not shown) in one side of front housing 194 so that when manually grasped and withdrawn, the containers discharge their contents.

In order to prevent superposed sections of strips 232 and 234 from being disturbed by succeeding sections of the strips, a plate 258 is affixed to rear housing 204. As a means preventing superposed sections of strips 232 and 234 from being disturbed by succeeding sections of strip 232 and for holding sections of strip 232 against forward wall 196 in position for exposure, a plate 260 is provided mounted on forward housing 194 for movement toward and away from forward wall 196. When the forward and rear housings are in closed position, plate 260 is urged toward forward wall 196 by a pair of leaf springs 262 secured to plate 258 at its opposite edges in order that the outermost photosensitive element 236 be properly positioned for exposure. Thus, the region or chamber between forward face 196 and plate 260 is a storage chamber for sections of strip 232, the region or chamber between rear face 206 and plate 258 is a storage chamber for sections of strip 234, and the region or chamber between the plates is a processing chamber within which associated elements 236 and 238 may be superposed.

A variety of alternative configurations of strips 236 and 238 within their respective storage chambers will be apparent to persons skilled in the art. While the invention is shown in the form of a magazine adapted for attachment to a camera, it should be apparent that the magazine may itself comprise a camera, requiring only the addition of suitable exposure means in association with aperture 216.

In operation, the magazine of FIG. 16 may be loaded by pivoting forward and rear housings 194 and 204 into open position, disposing strips 232 and 234 in their respective storage chambers, and extending their leading ends around rollers 224 and 226, respectively, and through the processing chamber and the lighttight passage defined by end walls 202 and 212. Once the magazine is closed, it may be removably attached, in conventional fashion, at the rear of a camera, and dark slide 213 may be opened to permit the photoexposure of outermost photosensitive element 236. At this point, the leading end of the container 250 overlying the V-shaped region defined by portions of strips 232 and 234 converging into superposition between rollers 224 and 226 is manually grasped. As this container is withdrawn through the slot through which the leading end projects, it discharges its contents in an elongated mass into the V-shaped region. Thereafter, by grasping the leading ends of the strips, they are advanced through the lighttight passage defined by lower end walls 202 and 212 in order to spread the processing fluid between elements 236 and 238. The resulting sandwich, while being formed, advances into the processing chamber and, once formed, is permitted to remain there for a predetermined period during which photosensitive element 236 is processed. At the end of this period, the sandwich is advanced through the lighttight passage from the magazine once more. Thereafter, the elements may be stripped apart to uncover the positive print. At this point, the photosensitive element succeeding the photosensitive element just processed underlies aperture 216 in proper position for photoexposure.

The Film Unit of FIGS. 18 and 19

The film unit of FIGS. 18 and 19 is provided with a rigid shield for protecting the container during handling and for causing the container to discharge its contents as it is withdrawn from between the sheets. The pressure-applying means for spreading the fluid between sheets here is provided by the camera in which the film unit is intended to be used. This film unit comprises a photosensitive sheet 264 and a print-receptive sheet 266 of the type described above, and an elongated container 628 and a shield 270, now to be described in detail.

Container 268 is constructed from a blank of three-ply sheet material having a single fold at 272, relatively strong edge and end seals at 274 and 276, and a relatively weak seal at 278 to provide a rupturable mouth. The outer ply serves as a backing or support and is composed of a thin, relatively inexpensive, tough material, preferably a paper such as kraft paper. The intermediate ply is composed of a substantially vapor- and liquid-impervious material, for example a metal foil such as aluminum or lead foil. The inner ply is composed of a thermoplastic or a thermosetting plastic material, for example a polyvinyl acetal such as polyvinyl butyral or polyvinyl formal, which protects the container contents from contamination. Edge and end seals 274 and 276 are formed by bonding the two folds of the inner ply to each other by the application of heat and pressure. Seal 278 is formed by bonding together the two folds of the inner ply by a strip of adhesive so constituted that the bonding forces between it and the inner ply are less than the cohesive forces between areas of the inner ply sealed to eaach other by the application of heat and pressure. A satisfactory strip may be composed, for example, of ethyl cellulose or a mixture of ethyl cellulose and paraffin, the mixture including at least 50% by weight of ethyl cellulose. Since the bonding forces between those sections defining the mouth are less than the bonding forces between other sections of the container, the application of opposed compressional forces to the container causes discharge of the container's contents through its mouth.

Shield 270 is U-shaped, having a pair of free ends 280 and 282 that provide a pair of planar pressure-applying surfaces, a bight portion 284 that is designed to receive the trailing end of container 268 and medial portions that are reciprocally dished for the protection of the fluid-containing compartment of container 268. Shield 270 is designed to cooperate in a camera with suitable pressure-applying means for spreading the fluid from the elongated mass between the sheets.

It is to be understood that although containers carrying quantities of photographic fluid for the treatment of single photographic frames are primarily contemplated by the present invention, nevertheless, certain aspects of the process of the present invention may be effected by a container carrying a quantity of photographic fluid for the treatment of a plurality of frames. Such a container is preferably a continuous tube of the same cross-sectional configuration as the tubes hereinabove described for individually processing a single area but is of a sufficiently greater length to carry enough liquid to process a plurality of image frames. Successive lengths of the tube are caused to discharge their contents adjacent successive image frames to process the latter. The tube may, in effect, comprise but a single liquid-carrying compartment but is preferably transversely sealed so that it consists of a plurality of separate compartments each of which may have a rupturable or removable portion adjacent its end, or may be notched or perforated in the apparatus to permit the contents of that compartment to be discharged endwise without disconnecting the compartment from the remainder of the tube.

The present invention thus provides novel techniques for supplying a predetermined quantity of photographic fluid in a manner which disposes of the fluid's container so that simplified pressure-applying members may be employed to spread the fluid between a pair of photographic sheets. A significant advantage of this novel method of containing and dispensing the processing fluid resides in the fact that the fluid deposits which are achieved thereby are essentially independent of the rate at which the elongated tube is withdrawn from between the two sheet materials. The tube can be withdrawn slowly, rapidly or at varying speed without affecting the uniformity with which its liquid content is deposited for the processing.

Since certain changes may be made in the above process, product and apparatus without departing from the scope of the invention herein involved, it is intended that all matter contained in the above description or shown in the accompanying drawings shall be interpreted as illustrative and not in a limiting sense.

What is claimed is:

1. The method of distributing a photographic fluid in contact with an area of a sheet to produce a composite photographic structure comprising a plurality of superposed layers, at least one of said layers including said fluid and at least one of said layers including a photographic image-recording material, said method comprising positioning a container, having an elongated cavity approximately equal in length to the width of said area, of substantially uniform cross section throughout its length and filled with said photographic fluid, adjacent a surface of said sheet near an edge of said area; moving said container in the direction of its length relative to and across said sheet along said edge of said area transversely of the direction of subsequent distribution of said fluid in contact with said sheet; while so moving said container, engaging sections of said container in the region of said cavity succeeding from the leading end of said cavity to eject substantially all of said fluid from said cavity and thereby dispense a quantity of said fluid substantially equal to the contents of said cavity from a mouth, located at the trailing end of said container and having a cross-sectional area substantially equal to the cross-sectional area of said cavity onto said sheet in the form of an elongated mass approximately equal in length to said cavity; and thereafter distributing said fluid from said elongated mass in a direction transversely of the direction of said mass by superposing said area of said sheet with another surface and applying compressive pressure to successive sections of said sheet commencing in the region of said elongated mass and progressing in the direction of distribution of said fluid.

2. The method of claim 1 wherein said fluid has a viscosity which is sufficient to cause said fluid to remain in said elongated mass during the interval between dispensing from said container and subsequent distribution.

3. The method of claim 1 wherein said fluid contains a reagent capable of reacting with said image-recording material following exposure thereof to produce a visible image in said material and said fluid is so distributed as to be reactively associated with said image-recording material.

4. The method of claim 1 wherein said image-recording material is contained in a layer on said area of said sheet.

5. The method of claim 1 wherein the fluid contents of said container include said photographic image-recording material and said material is distributed in a layer on said area of said sheet.

6. The method of claim 1 wherein said sheet is arranged for superpositioning with a second sheet providing said surface against which said fluid is distributed, said container is positioned between said sheets for movement in the direction of its elongation and is withdrawn from between said sheets during dispensing of said fluid from said mouth onto one of said sheets.

7. The method of claim 1 wherein said fluid is ejected from said cavity by the application of compressive pressure to successive sections of said container in the region of said cavity, and compressive pressure is applied to said container by means which are held substantially fixed with respect to said sheet during dispensing of said fluid from said container.

8. The method of claim 7 wherein compressive pressure is applied to said container and to said sheet by moving said container and said sheet through gaps between pairs of juxtapositioned members and at least the gap through which said sheet is moved is of substantially fixed maximum depth.

9. The method of distributing a photographic fluid in contact with an area of a sheet to effect a photographic process, said method comprising positioning a container, having an elongated cavity approximately equal in length to the width of said area, of substantially uniform cross section throughout its length and filled with said photographic fluid, adjacent a surface of said sheet near an edge of said area; moving said container in the direction of its length relative to and across said sheet along said edge of said area transversely of the direction of subsequent distribution of said fluid; while so moving said container, engaging sections of said container in the region of said cavity succeeding from the leading end of said cavity to eject substantially all of said fluid from said cavity and thereby dispense a quantity of said fluid substantially equal to the contents of said cavity from a mouth, located at the trailing end of said container and having a cross-sectional area substantially equal to the cross-sectional area of said cavity, onto said sheet in the form of a uniformly distributed elongated mass approximately equal in length to said cavity, holding means, by which said container is engaged to dispense its fluid contents, against movement relative to said sheet as said fluid is being dispensed from said mouth so as to prevent movement of said fluid relative to said sheet in the direction of movement of said container relative to said sheet; and thereafter distributing said fluid from said elongated mass in a direction transversely of the direction of elongation of said mass by superposing said area of said sheet with another sheet and applying compressive pressure to successive portions of said sheets commencing in the region of said elongated mass and progressing in the direction of distribution of said fluid.

10. The method of distributing a photographic fluid in contact with an area of a sheet to effect a photographic process, said method comprising positioning an elongated tubular container, having an elongated cavity approximately equal in length to the width of said area, of substantially uniform cross section throughout its length, filled with said photographic fluid and terminating in a discharge mouth having a cross-sectional area substantially equal to the cross-sectional area of said cavity, adjacent a surface of said sheet near an edge of said area; moving said container in the direction of its length relative to and across said sheet along said edge of said area transversely of the direction of subsequent distribution of said fluid in contact with said sheet; while so moving said container, engaging successive sections of said container commencing at the end of said cavity opposite said mouth and progressing toward said mouth for ejecting substantially all of said fluid from said cavity and thereby dispensing from said mouth a quantity of said fluid substantially equal to the contents of said cavity onto said sheet in the form of a uniformly distributed elongated mass approximately equal in length to said cavity; and thereafter distributing said fluid from said elongated mass in a direction transversely of the direction of said mass by superposing said area of said sheet with another surface and applying compressive pressure to successive sections of said sheet commencing in the region of said elongated mass and progressing in the direction of distribution of said fluid.

11. The method of producing a visible photographic image on an area of a sheet comprising positioning a container having an elongated cavity approximately equal in length to the width of said area, of approximately uniform cross section throughout its length and filled with a photographic fluid, adjacent a surface of said sheet near an edge of said area, said area of said sheet including a layer comprising at least one of a photographic image-recording material and a reagent reactable with said image-recording material following exposure thereof for producing a visible image in said material, said fluid including at least a reagent capable of rendering the first-mentioned reagent reactable with said image-recording material; moving said container in the direction of its length relative to and across said sheet along said edge of said area transversely of the direction of subsequent distribution of said fluid in contact with said sheet; while so moving said container, engaging sections of said container in the region of said cavity succeeding from the leading end of said cavity to eject substantially all of said fluid from said cavity and thereby dispense a quantity of said fluid, substantially equal to the contents of said cavity, from a mouth located at the trailing end of said container and having a cross-sectional area substantially equal to the cross-sectional area of said cavity, onto said sheet in the form of a uniform distributed elongated mass approximately equal in length to said cavity; and thereafter distributing said fluid from said elongated mass in a direction transversely of the direction of said mass to form a composite structure comprising a plurality of superposed layers including a layer of said photographic image-recording material in which said first-mentioned reagent is reactively associated with said material, by superposing said area of said sheet with another surface and applying compressive pressure to successive sections of said sheet commencing in the region of said elongated mass and progressing in the direction of distribution of said fluid; and at some stage in said process photoexposing said photosensitive image-recording material to form an image therein.

12. The method of distributing a plurality of photographic fluids in contact with an area of a sheet in order to effect a photographic process, said method comprising locating a container having a plurality of elongated cavities, approximately equal in length to the width of said area, arranged in side-by-side relation and each being of substantially uniform cross section throughout its length and filled with one of said fluids, adjacent a surface of said sheet near an edge of said area; moving said container in the direction of its length relative to and across said sheet along said edge of said area transversely of the direction of subsequent distribution of said fluids in contact with said sheet; while so moving said container progressively engaging sections of said container in the region of said cavities succeeding from the leading end of said cavities to eject substantially all of said fluids from said cavities and thereby dispense quantities of said fluids substantially equal to the contents of said cavities from mouths, located at the trailing end of said container and having cross-sectional areas substantially equal to the cross-sectional areas of said cavities with which said mouths are associated, onto said sheet in the form of side-by-side elongated masses approximately equal in length to said cavities; and thereafter distributing said fluids from said elongated masses in a direction transversely of the direction of elongation of said masses by superposing said area of said sheet with another surface and applying compressive pressure to successive sections of said sheet commencing in the region of said elongated masses and progressing in the direction of distribution of said fluid.

13. A photographic film unit comprising, in combination, a first sheet including a layer of a photographic light-sensitive image-recording material on an area of said sheet, a second sheet arranged in superposed relation with said first sheet with said layer of image-recording material located between the outer surfaces of said sheets, said sheets being frangibly bonded to one another substantially throughout the longitudinal edges and one of said end edges of said film unit, and an elongated tubular container engaged between said sheets at the other end of said film unit opposite said one end edge and being free for movement in the direction of its elongation from between said sheets, said container extending substantially from side-to-side of said film unit, at least one of the ends of said container extending beyond at least one of said longitudinal edges of said film unit, said container having a cavity approximately equal in length to the width of said area, of substantially uniform cross section throughout its length, filled with a processing fluid and having a closed discharge mouth with a cross-sectional area equal to the cross-sectional area of said cavity and constructed to open and release said fluid in response to the application of opposed compressional forces sequentially to sections of said container succeeding from said one end thereof during movement of said container relative to said sheets in the direction of said one end.

14. The photographic film unit of claim 13 wherein said image-forming material is capable of forming a latent image in response to exposure to actinic light and said fluid comprises a reagent reactable with said image-forming material to produce a visible image.

15. The photographic film unit of claim 13 wherein a rigid member is provided extending across the outer surfaces of said first and second sheets in the region of said container for protecting said container from inadvertent forces exerted during handling of said film unit, said rigid member being constructed to permit movement of said container in the direction of its elongation from between said sheets.

16. The photographic film unit of claim 15 wherein said rigid member includes sections providing a pair of opposed pressure-applying surfaces located in engagement with said container adjacent said one end of said container for applying compressive pressure to said container during withdrawal thereof in the direction of its elongation from between said sheets.

17. The photographic film unit of claim 15 wherein said rigid member includes sections providing a pair of opposed pressure-applying surfaces engaged on opposite sides of said first and second sheets in the region of said other end of said film unit for applying compressive pressure to said sheets for spreading said fluid therebetween during movement of said sheets between said pressure-applying surfaces.

18. The photographic film unit of claim 15 wherein portions of said rigid member provide two pairs of opposed pressure-applying surfaces, one of said pairs of pressure-applying surfaces being disposed in engagement with said container adjacent said one end thereof for applying compressive pressure to said container during withdrawal movement of said container in the direction of its elongation from between said sheets, the surfaces of the other of said pairs of surfaces being engaged on opposite sides of said sheets in the region of said other end of said film unit for applying compressive pressure to said sheets for distributing said fluid therebetween during movement of said sheets between said surfaces of said other pair.

19. The photographic film unit of claim 17 wherein the opposed pressure-applying surfaces of each of said pairs comprise the sides of a slot in said rigid member.

20. A photographic device comprising, in combination, a housing defining a chamber, a photosensitive element mounted for exposure within said chamber, said housing including exposure means for admitting actinic radiation into said chamber to expose said photosensitive element, a second element mounted within said chamber adjacent said photosensitive element for movement into superposition therewith, a pair of pressure-applying members mounted within said chamber adjacent one end of said housing for guiding said photosensitive and second elements into superposition and distributing a processing fluid between said elements during movement thereof in superposition between said pressure-applying members, the opposite end of said housing including means providing a lighttight passage permitting withdrawal of said photosensitive and second elements in superposition from said chamber, portions of said photosensitive and second elements extending between said pressure-applying members through said passage and providing means engageable exterior of said housing for drawing said elements in superposition between said pressure-applying members and from said housing, engagement means mounted on said housing adjacent said passage, and an elongated container mounted within said chamber adjacent said pressure-applying members for movement in the direction of its elongation transversely of the direction of movement of said elements between said pressure-applying members, said container including a fluid-filled cavity of substantially uniform cross section throughout its length and terminating in a discharge mouth having a cross-sectional area substantially equal to the cross-sectional area of said cavity, a portion of said container at the end thereof opposite said mouth extending from said housing in engagement with said engagement means, said engagement means being provided for so engaging said container, during its withdrawal from said chamber, as to discharge the fluid contents of said container in an elongated mass between said elements for subsequent distribution therebetween by said pressure-applying members.

21. A photographic device comprising, in combination, a generally flat housing defining a chamber, a photosensitive element mounted for exposure within said chamber, said housing including a face providing a path for admitting actinic radiation into said chamber to expose said photosensitive element, a second element mounted within said chamber adjacent said first element and movable into superposition therewith, a first pair of pressure-applying members located within said chamber adjacent one end of said housing for guiding said photosensitive and second elements into superposition and distributing a processing fluid between said elements during movement thereof in superposition between said pressure-applying members, the opposite end of said housing including means providing a lighttight passage permitting withdrawal of said photosensitive and second elements from said chamber, portions of said photosensitive and second elements extending between said pressure-applying members from said housing and providing means for engaging and withdrawing said elements in superposition from said housing through said passage, a second pair of pressure-applying members mounted within said chamber adjacent said first pair of pressure-applying members, and an elongated container mounted within said housing adjacent said first pair of pressure-applying members for movement in the direction of its elongation between said second pair of pressure-applying members in a direction transversely of the direction of movement of said element between said first pair of pressure-applying members, said container including a fluid-filled cavity of substantially uniform cross section throughout its length and terminating in a discharge mouth having a cross-sectional area substantially equal to the cross-sectional area of said cavity, a portion of said container at the end thereof opposite said mouth extending from said housing between said pressure-applying members of said second pair, said second pair of pressure-applying members comprising means for compressing successive sections of said container in the region of said cavity as said container is withdrawn from said chamber for discharging the fluid contents of said container from said mouth in an elongated mass between said elements for subsequent distribution therebetween by said first pair of pressure-applying members.

22. A photographic film assemblage capable of being exposed and processed to produce a visible photographic image, said assemblage comprising, in combination, a housing having forward and rear faces, said forward face including exposure means for admitting actinic radiation into said housing to expose a photosensitive element positioned for exposure within said chamber, a pair of sheets mounted within said chamber, each of said sheets including a first section disposed adjacent a face of said housing, a second section superposed with the second section of the other of said sheets and disposed between said first sections of said sheets and a loop connecting said first and second sections located near an extremity of said housing, means providing a lighttight passage in the opposite extremity of said housing, said first section of one of said sheets including a photosensitive image-recording material, said second sections extending in superposition through said passage from said chamber and providing means whereby said sheets may be engaged for withdrawing at least portions of said sheets from said chamber for processing said sheets, an elongated tubular container positioned within said chamber at said one extremity in the region of said loops, said container including a cavity of substantially uniform cross section filled with a fluid capable of effecting the formation of a visible image in said photosensitive material following exposure thereof when distributed in a layer between said first and second sections of said sheet, said container including a closed discharge mouth at one end having, when opened, a cross-sectional area substantially equal to the cross-sectional area of said cavity, the opposite end of said container projecting from said chamber and providing means for engaging and withdrawing said container in the direction of its elongation from said chamber transversely of said sheets, and means associated with said housing for engaging said container during withdrawal thereof and causing the discharge of the fluid contents of said container from said mouth onto at least one of said sheets in the form of a uniformly distributed mass.

23. A photographic film assemblage adapted to be exposed and processed to produce a plurality of photographic images, said assemblage comprising, in combination, a housing having forward and rear faces and defining a chamber, said forward face including exposure means for admitting actinic radiation into said chamber to expose a photosensitive element positioned for exposure within said chamber, a pair of sheets mounted within said chamber, each of said sheets including a first section and a second section, said first section of one of said sheets being disposed adjacent said forward face of said housing, said first section of said other sheet being disposed adjacent said rear face of said housing, said second sections being disposed in superposed relation between said first sections of said sheets, and a loop connecting said first and second sections located near one extremity of said housing, each of said sheets including at least one additional first section and one additional second section, said additional sections of said each sheet being joined to said first section of said each sheet near the opposite extremity of said housing and being arranged in zigzag-folded, overlying relation between the first-mentioned first and second sections of said each sheet, said first and second sections of said each sheet being arranged alternately, and each of said first sections of said one sheet including a photosensitive image-recording material, means providing a lighttight passage at said opposite extremity of said housing, the first-mentioned second sections of said sheets extending in superposition through said passage from said chamber and providing means for engaging said sheets and withdrawing at least portions of said sheets from said chamber for processing said sheets, a plurality of elongated tubular containers positioned within said chamber at said one extremity in the region of said loops, each of said containers including a cavity of substantially uniform cross section throughout its length and filled with a quantity of a fluid capable of effecting the formation of a visible image in said photosensitive material following exposure thereof, one of the ends of each of said containers projecting from said chamber and providing means for engaging said each container and withdrawing it in the direction of its elongation from said chamber transversely of said sheets, the other of said other ends of said each container including a closed mouth which, when opened, has a cross-sectional area substantially equal to the cross-sectional area of said cavity, and means associated with said housing for engaging said each container during withdrawal thereof and causing the discharge of the fluid contents of said each container from said mouth onto one of said sheets in the form of an elongated mass.

24. A photographic film assemblage adapted to be exposed and processed to produce a plurality of photographic images, said assemblage comprising, in combination, a housing having forward and rear faces and defining a chamber, said forward face including exposure means for admitting actinic radiation into said chamber to expose a photosensitive element positioned for exposure within said chamber, a pair of sheets mounted within said chamber, each of said sheets including a first section and a second section, said first section of one of said sheets being disposed adjacent said forward face of said housing, said first section of the other of said sheets being disposed adjacent said rear face of said housing, said second sections being disposed in superposition between said first sections of said sheets and a loop connecting said first and second sections located near one extremity of said housing, each of said sheets including at least one additional first section and one additional second section, said additional sections of said each sheet being joined to said first sections of said each sheet at the opposite extremity of said housing and being arranged in zigzag-folded, overlying relation between the first-mentioned first and second sections of said each sheet, said first and second sections of said each sheet being arranged alternately, each of said first sections of said one sheet including a photosensitive image-recording material, a pair of juxtaposed pressure-applying members located on opposite sides of said first-mentioned first sections at said one extremity of said housing for guiding said sheets into superposition and distributing a fluid in a layer between said first sections of both of said sheets during movement of the last-mentioned first sections of said sheets in superposition between said pressure-applying members, each of said loops extending around one of said pressure-applying members, means providing a lighttight passage at the other extremity of said housing, portions of said first-mentioned second sections of said sheets extending in superposition through said chamber from said passage to provide means for engaging and withdrawing at least portions of said sheets from said chamber to move said first sections of said sheets between said pressure-applying members, a plurality of elongated tubular containers positioned within said chamber at said one extremity in the region of said loops, each of said containers including an elongated cavity of substantially uniform cross section throughout its length and filled with a quantity of a fluid capable of effecting the formation of a visible image in said photosensitive material when distributed in contact with said photosensitive material, one of the ends of each of said containers projecting from said chamber and providing means for engaging said each container and withdrawing it in the direction of its elongation from said chamber transversely of the direction of movement of said sheets between said pressure-applying members, the opposite end of said each container including a closed mouth which, when opened, has a cross-sectional area substantially equal to the cross-sectional area of said cavity, and means associated with said housing for engaging said each container during withdrawal thereof and causing the discharge of the fluid contents of said each container from said mouth in the form of an elongated mass onto one of said sheets.

25. A photographic device for supplying and dispensing a pair of sheets each comprising a succession of areas to be treated with a fluid provided on at least one of said sheets, said apparatus comprising, in combination, a housing, supplies of said sheets mounted within said housing, a plurality of elongated containers disposed within said housing for movement in succession into juxtaposition with at least one of said sheets adjacent transverse edges of said areas thereof, each of said containers comprising an elongated cavity having a substantially uniform cross-section throughout its length, filled with a quantity of processing fluid, and terminating in a closed discharge mouth which, when opened, has a cross-sectional area substantially equal to the cross-sectional area of said cavity, each of said containers being movable from a position in juxtaposition with said one sheet adjacent a transverse edge of an area thereof in the direction of its elongation relative to and across said one sheet to dispense the fluid contents of said each container from said mouth onto said one sheet in the form of a uniformly distributed elongated mass adjacent a transverse edge of said area.

26. Photographic apparatus comprising, in combination, a housing, means within said housing for supporting a photographic image-recording sheet material in position for exposure, means for exposing said sheet material to actinic radiation, a lighttight passage in said housing for permitting the withdrawal from said housing of said image-recording sheet material, a first pair of pressure-applying members arranged in juxtaposition within said housing adjacent said passage for engaging and applying compressive pressure to said sheet material during movement of said material through said passage, means for positioning an elongated container adjacent said first pair of pressure-applying members and a second pair of pressure-applying members mounted in juxtaposition within said housing adjacent said first pair of pressure-applying members for engaging and applying compressive pressure to said container during withdrawal movement of said container from said housing in the direction of elongation of said container transversely of the direction of movement of said sheet material through said passage between said pressure-applying members of said first pair.

27. The photographic apparatus of claim 26 wherein pressure-applying members of said first pair are positioned for engaging said material substantially in a first plane during movement of said material between said last-mentioned members, and said pressure-applying members of said second pair are positioned for applying compressive pressure to said container substantially in a second plane angularly exposed with respect to said first plane.

References Cited in the file of this patent

UNITED STATES PATENTS

| | | |
|---|---|---|
| 1,277,048 | De Brayer | Aug. 27, 1918 |
| 1,911,671 | Blauvelt | May 30, 1933 |
| 1,922,811 | Kabnick | Aug. 15, 1933 |
| 2,129,627 | Sands et al. | Sept. 16, 1938 |
| 2,272,530 | Patterson | Feb. 10, 1942 |
| 2,455,126 | Land | Nov. 30, 1948 |
| 2,467,320 | Land | Apr. 12, 1949 |
| 2,520,641 | Land | Aug. 29, 1950 |
| 2,543,181 | Land | Feb. 27, 1951 |
| 2,558,856 | Land | July 3, 1951 |
| 2,647,056 | Land | July 28, 1953 |
| 2,669,516 | Land | Feb. 16, 1954 |
| 2,671,389 | Land | Mar. 9, 1954 |
| 2,750,075 | Land et al. | June 12, 1956 |

FOREIGN PATENTS

| | | |
|---|---|---|
| 567,011 | Germany | Dec. 24, 1932 |

OTHER REFERENCES

Ellis: Patent Claims, Baker, Voorhis & Co., New York, 1949, pp. 194–209 and 474–481.

UNITED STATES PATENT OFFICE

CERTIFICATE OF CORRECTION

Patent No. 3,047,387                                         July 31, 1962

Edwin H. Land

It is hereby certified that error appears in the above numbered patent requiring correction and that the said Letters Patent should read as corrected below.

Column 2, line 69, for "processes" read -- process --; column 4, line 15, for "predermined" read -- predetermined --; column 9, line 14, for "sides" read -- side --; column 10, line 8, for "continer" read -- container --; column 12, line 13, for "loop" read -- loops --; column 14, line 28, for "sections of a strip" read -- sections of strip --; line 32, for "underly face 198" read -- underlying face 196 --; column 15, line 52, for "628" read -- 268 --; line 73, for "eaach" read -- each --; column 17, line 25, for "1" read -- 3 --; column 18, line 64, for "uniform" read -- uniformly --.

(SEAL)          Signed and sealed this 14th day of July 1964.

Attest:

ESTON G. JOHNSON                              EDWARD J. BRENNER
Attesting Officer                                 Commissioner of Patents